US011520163B2

(12) United States Patent
Lee et al.

(10) Patent No.: US 11,520,163 B2
(45) Date of Patent: *Dec. 6, 2022

(54) STEREOSCOPIC IMAGE APPARATUS

(71) Applicant: RealD Inc., Beverly Hills, CA (US)

(72) Inventors: Chui Woo Lee, Seongnam-si (KR);
Sung Ho Cho, Seoul (KR); Byung Gul Lim, Yongin-si (KR)

(73) Assignee: RealD Inc., Beverly Hills, CA (US)

(*) Notice: Subject to any disclaimer, the term of this patent is extended or adjusted under 35 U.S.C. 154(b) by 49 days.

This patent is subject to a terminal disclaimer.

(21) Appl. No.: 17/117,053

(22) Filed: Dec. 9, 2020

(65) Prior Publication Data
US 2021/0088806 A1 Mar. 25, 2021

Related U.S. Application Data

(63) Continuation of application No. 15/946,574, filed on Apr. 5, 2018, now Pat. No. 10,914,965, which is a
(Continued)

(30) Foreign Application Priority Data

Apr. 2, 2013 (KR) .................. 10-2013-0035805

(51) Int. Cl.
G02B 30/25 (2020.01)
G02B 27/28 (2006.01)
(Continued)

(52) U.S. Cl.
CPC ........... *G02B 30/25* (2020.01); *G02B 5/3083* (2013.01); *G02B 27/285* (2013.01); *G02B 30/24* (2020.01); *G03B 35/26* (2013.01); *G02B 27/283* (2013.01)

(58) Field of Classification Search
CPC ...... G03B 21/00–64; H04N 9/31–3197; G02B 27/01–0189; G02B 2027/0105–0198
See application file for complete search history.

(56) References Cited

U.S. PATENT DOCUMENTS 5,225,861 A 7/1993 Marks
5,283,600 A 2/1994 Imai
(Continued)

FOREIGN PATENT DOCUMENTS

CN 101021674 A 8/2007
CN 101398536 A 4/2009
(Continued)

OTHER PUBLICATIONS

Masterimage3d: "Installation & Operation Manual; HORIZON3D & HORIZON3D S 55 HORIZON3D&HORIZON3D S Digital 3D Cinema System Installation & Operation Manual", Jul. 14, 2014, pp. 1-67, XP055276940.
(Continued)

*Primary Examiner* — Christopher A Lamb, II
(74) *Attorney, Agent, or Firm* — Penny L. Lowry

(57) ABSTRACT

A stereoscopic image apparatus that is capable of minimizing loss of optical energy and improving quality of a stereoscopic image is disclosed. The stereoscopic image apparatus includes a polarizing beam splitter to reflect or transmit incident light based on polarization components of the light to split the light in at least three different directions, a reflective member to reflect the light reflected by the polarizing beam splitter to a screen, at least one modulator to modulate the light reflected by the reflective member and the light transmitted through the polarizing beam splitter, and a refractive member disposed in an advancing direction
(Continued)

of light to be incident upon the polarizing beam splitter to refract the light to be incident upon the polarizing beam splitter.

20 Claims, 13 Drawing Sheets

Related U.S. Application Data continuation of application No. 14/382,336, filed as application No. PCT/KR2014/002563 on Mar. 26, 2014, now Pat. No. 9,958,697.

(51) Int. Cl.
   G03B 35/26      (2021.01)
   G02B 30/24      (2020.01)
   G02B 5/30       (2006.01)

(56) References Cited

U.S. PATENT DOCUMENTS

| | | | |
|---|---|---|---|
| 5,359,455 | A | 10/1994 | Oishi |
| 5,381,278 | A | 1/1995 | Shingaki et al. |
| 5,729,306 | A | 3/1998 | Miyake et al. |
| 5,772,299 | A | 6/1998 | Koo et al. |
| 5,982,538 | A | 11/1999 | Shikama et al. |
| 6,094,240 | A | 7/2000 | Hiyama et al. |
| 6,912,074 | B1 | 6/2005 | Son et al. |
| 7,559,653 | B2 | 7/2009 | Silverstein |
| 7,857,455 | B2 | 12/2010 | Cowan et al. |
| 8,134,109 | B2 | 3/2012 | Tang |
| 8,842,222 | B2 | 9/2014 | Iversen |
| 2008/0143965 | A1* | 6/2008 | Cowan ............... G03B 35/26 353/8 |
| 2010/0103379 | A1 | 4/2010 | Fiess |
| 2010/0141856 | A1 | 6/2010 | Schuck et al. |
| 2011/0053247 | A1 | 3/2011 | Baker et al. |
| 2011/0096295 | A1 | 4/2011 | Cowan et al. |
| 2011/0205496 | A1 | 8/2011 | Schuck et al. |
| 2012/0057134 | A1 | 3/2012 | Huang |
| 2013/0063701 | A1 | 3/2013 | Ouderkirk et al. |
| 2014/0104580 | A1 | 4/2014 | Tsai et al. |
| 2014/0293416 | A1 | 10/2014 | Ward et al. |
| 2015/0109539 | A1 | 4/2015 | Li et al. |

FOREIGN PATENT DOCUMENTS

| | | |
|---|---|---|
| CN | 101408675 B | 4/2009 |
| CN | 101726985 A | 6/2010 |
| CN | 103458208 A | 12/2013 |
| CN | 103529637 A | 1/2014 |
| CN | 203405635 U | 1/2014 |
| CN | 203705728 U | 7/2014 |
| CN | 104272172 A | 1/2015 |
| DE | 102008043153 A1 | 4/2010 |
| EP | 2469336 B1 | 6/2012 |
| EP | 2846180 A1 | 3/2015 |
| JP | H05203894 A | 8/1993 |
| JP | H05241103 A | 9/1993 |
| JP | 06317760 | 11/1994 |
| JP | h078511 A | 1/1995 |
| JP | 07146474 | 6/1995 |
| JP | H07146474 A | 6/1995 |
| JP | H07239473 A | 9/1995 |
| JP | H07333557 A | 12/1995 |
| JP | H09120047 A | 5/1997 |
| JP | 2010506199 A | 2/2010 |
| JP | 2010507130 A | 3/2010 |
| JP | 2010072138 A | 4/2010 |
| JP | 2010122589 A | 6/2010 |
| JP | 2010164802 A | 7/2010 |
| JP | 2010276710 A | 12/2010 |
| JP | 2011022530 A | 2/2011 |
| JP | 2013003327 A | 1/2013 |
| JP | 2013020199 A | 1/2013 |
| JP | 2014052930 A | 3/2014 |
| JP | 2015006199 A | 1/2015 |
| KR | 1020090089325 A | 8/2009 |
| KR | 1020090094224 A | 9/2009 |
| SU | 1182471 A1 | 9/1985 |
| WO | 2008048494 A2 | 4/2008 |
| WO | 2014163322 A1 | 10/2014 |
| WO | 2014191439 A1 | 12/2014 |

OTHER PUBLICATIONS

EP21183307.4 Extended European Search Report of European Patent Office dated Oct. 21, 2021.
Australian Office Action in Appln. No. 2014218464 dated Mar. 19, 2015.
Canadian Office Action in Appln. No. 2,861,727 dated May 4, 2015.
Chinese Office Action in Appln. No. 201480000777.6 dated Feb. 29, 2016.
Chinese Office Action in Appln. No. 201480000777.6 dated Oct. 31, 2016 with English translation.
European Search Report in Appln. No. 14742448.5 dated Apr. 14, 2015.
European Search Report in Appln. No. 14871124.5 dated Aug. 17, 2016.
International Search Report and Written Opinion of the International Searching Authority dated Jul. 7, 2015 for Application No. PCT/IB2014/002886.
International Search Report in International Application No. PCT/KR2014/002563, dated Jun. 23, 2014.
Photography Measurement Experiment Course, Fei Deng et al., Wuhan University Press, the first edition in May 2012, pp. 47-48: 5.3.2 Stereoscopic Display System in Digital Era.
Russian Decision on Grant in Appln. No. 2014135220 dated Nov. 24, 2015.
The Basis and Application of Virtual Reality Technology, Xiaoqiang Hu, Beijing University of Posts and Telecommunications Press, the first edition in Feb. 2009, pp. 97-99: 3.1 Stereoscopic Display Technology.
Theory and Methods of Design System for Digitalized Railway Line Selection, Sirong Yi, Southwest Jiao Tong University Press, the first edition in Nov. 2011, pp. 285-286: 2 Polaroid.

* cited by examiner

[Fig. 1]
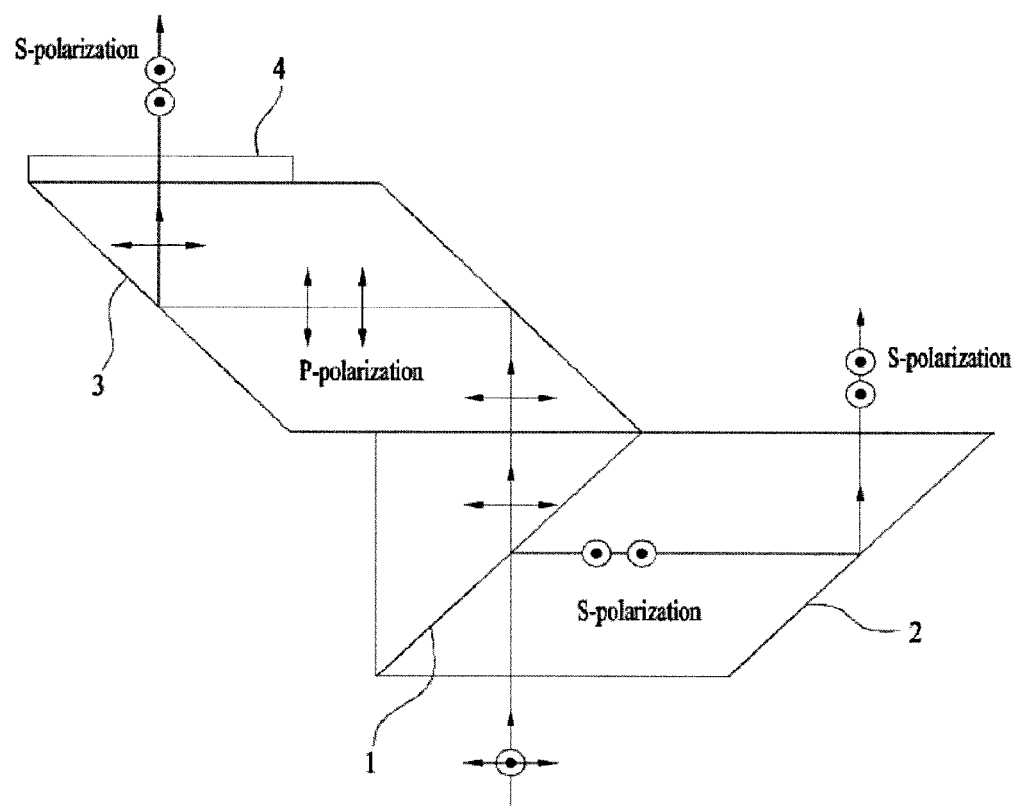

[Fig. 2]
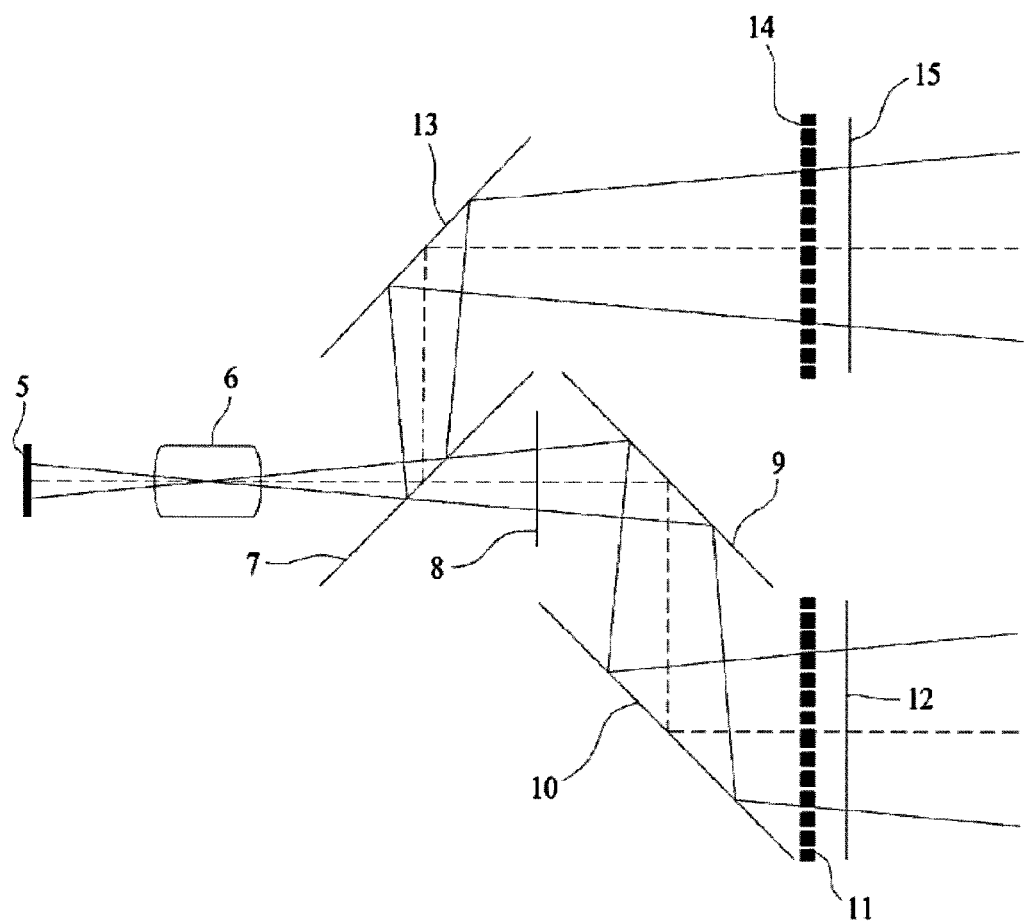

[Fig. 3]
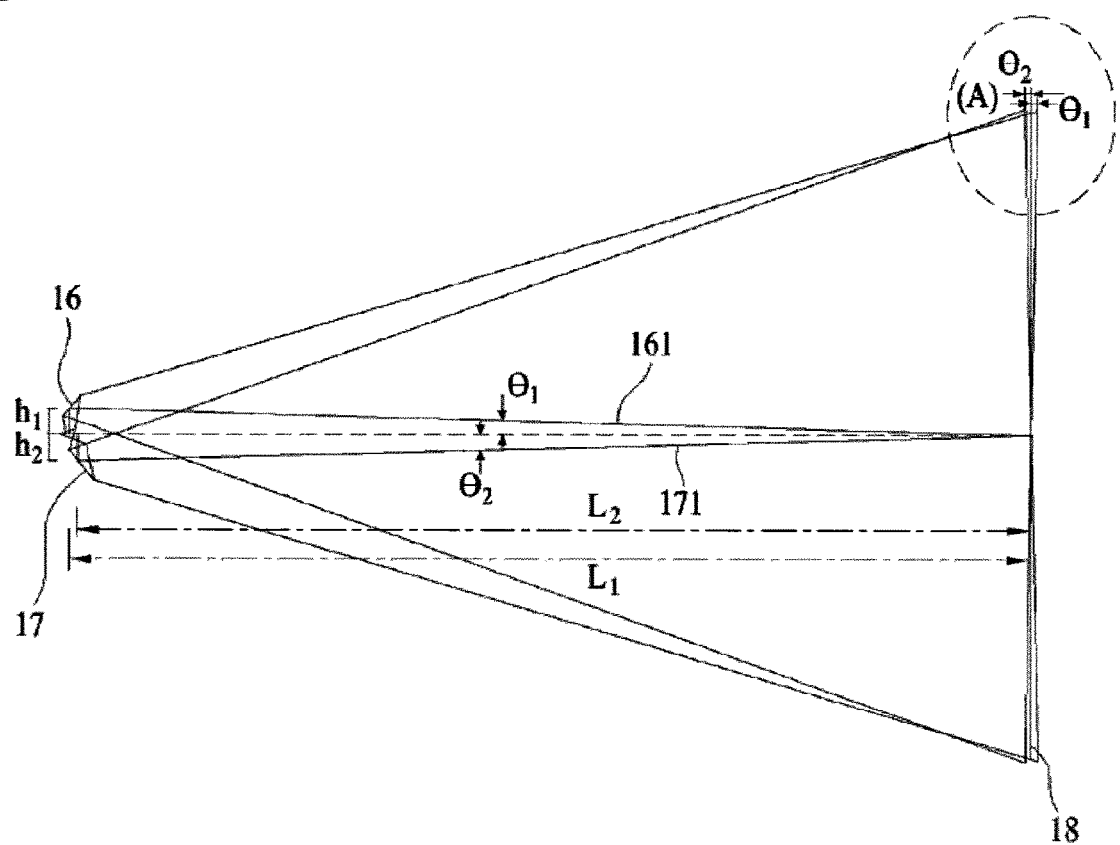

[Fig. 4]
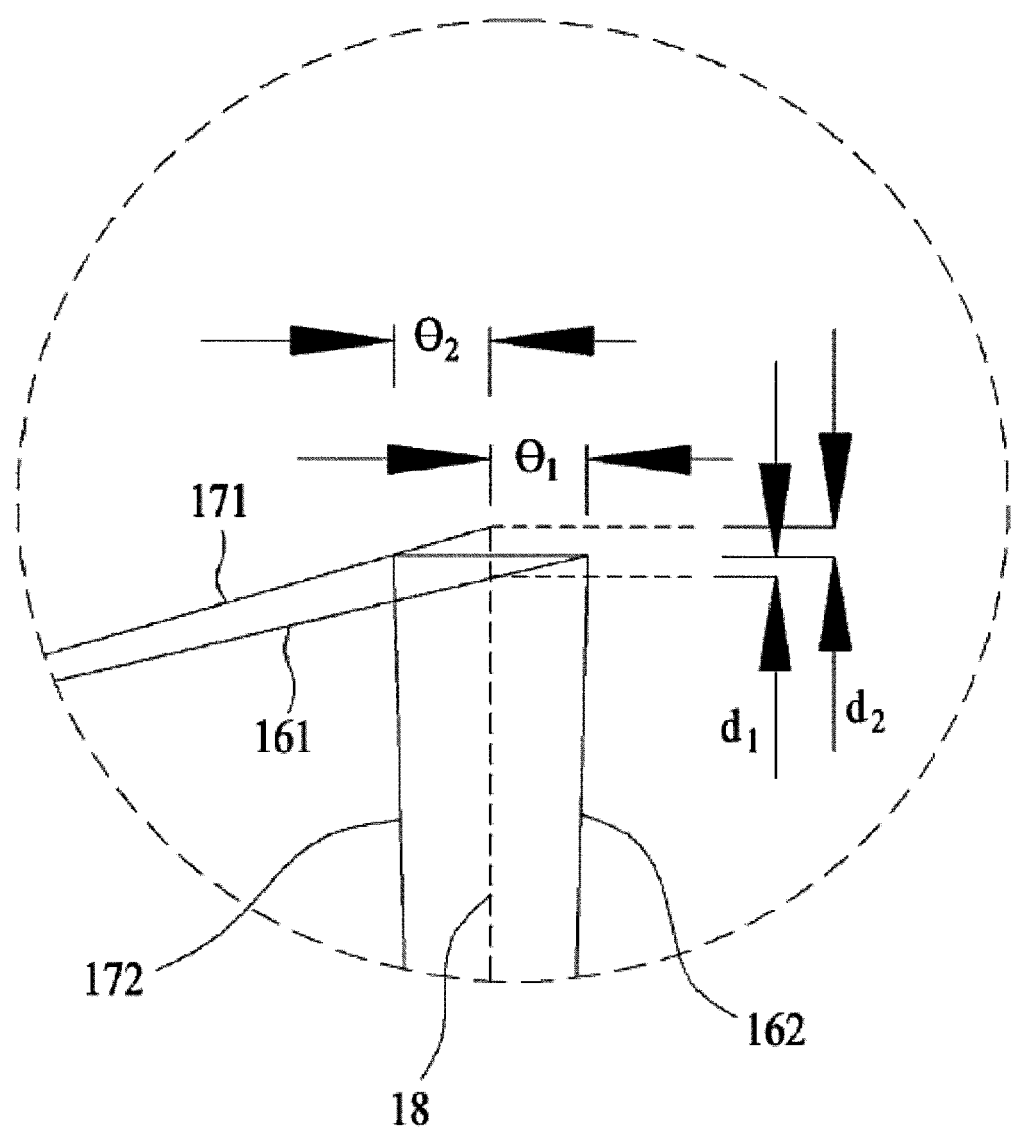

[Fig. 5]
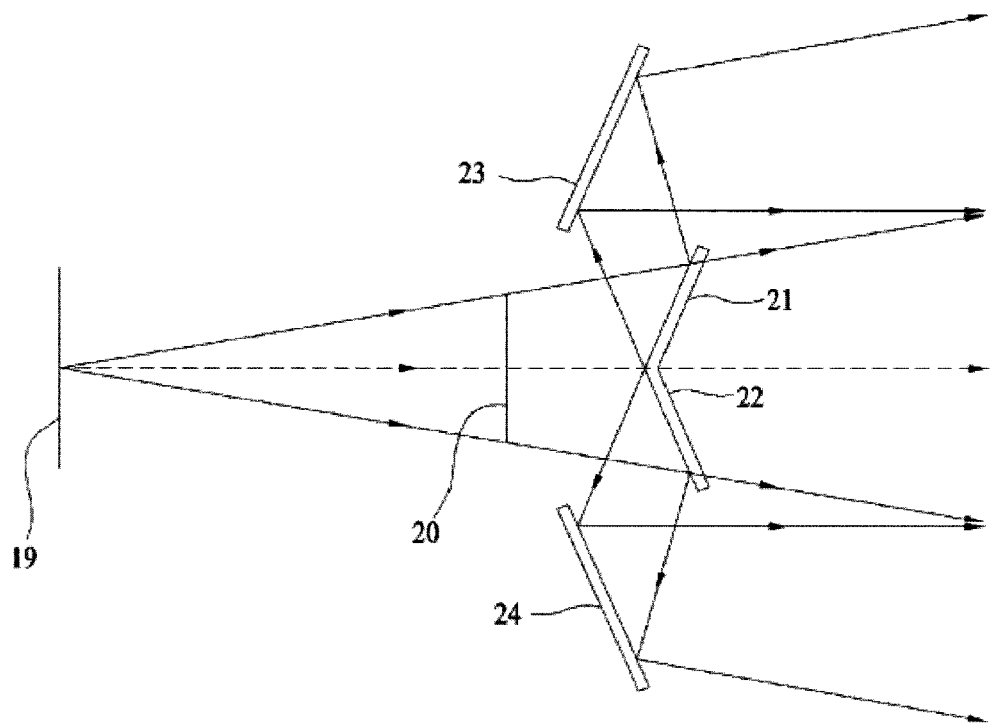

[Fig. 6]
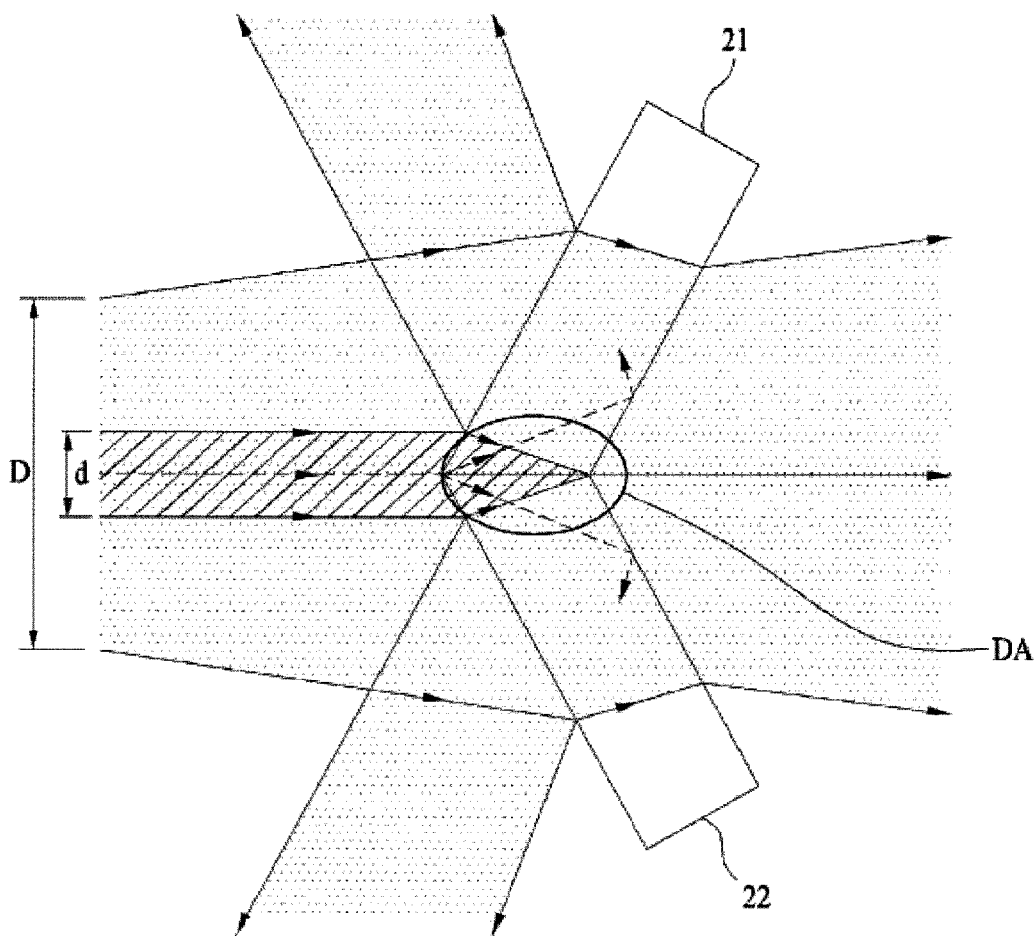

[Fig. 7]
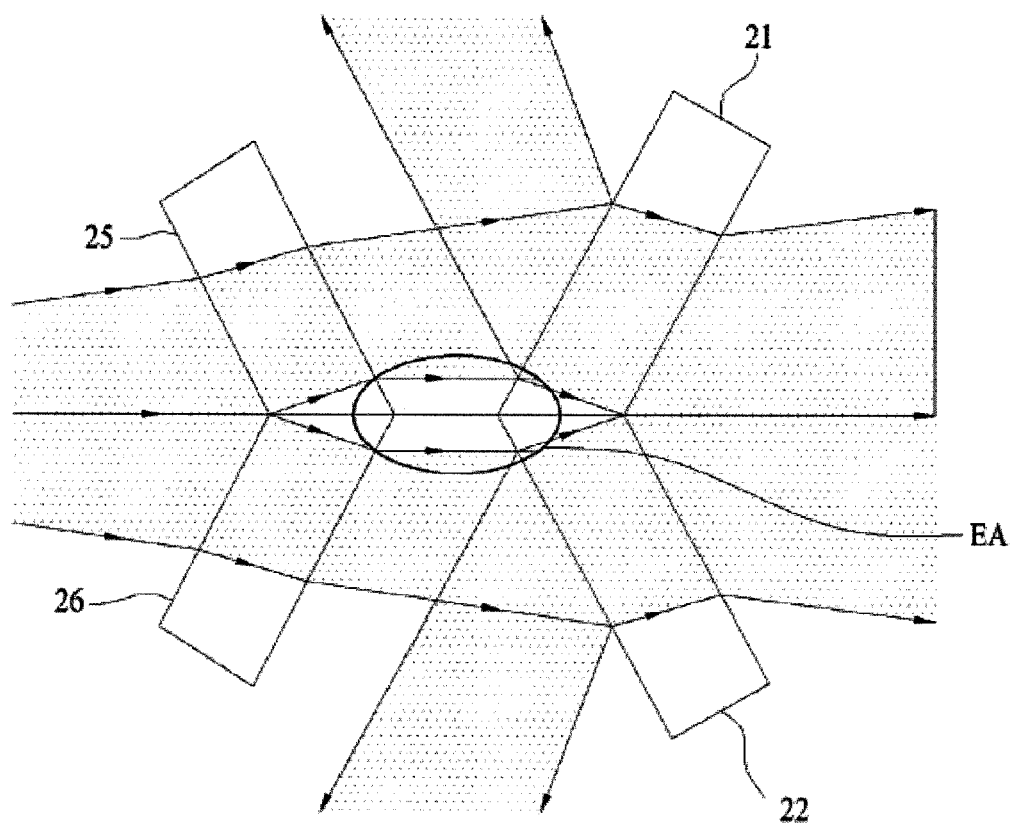

[Fig. 8]
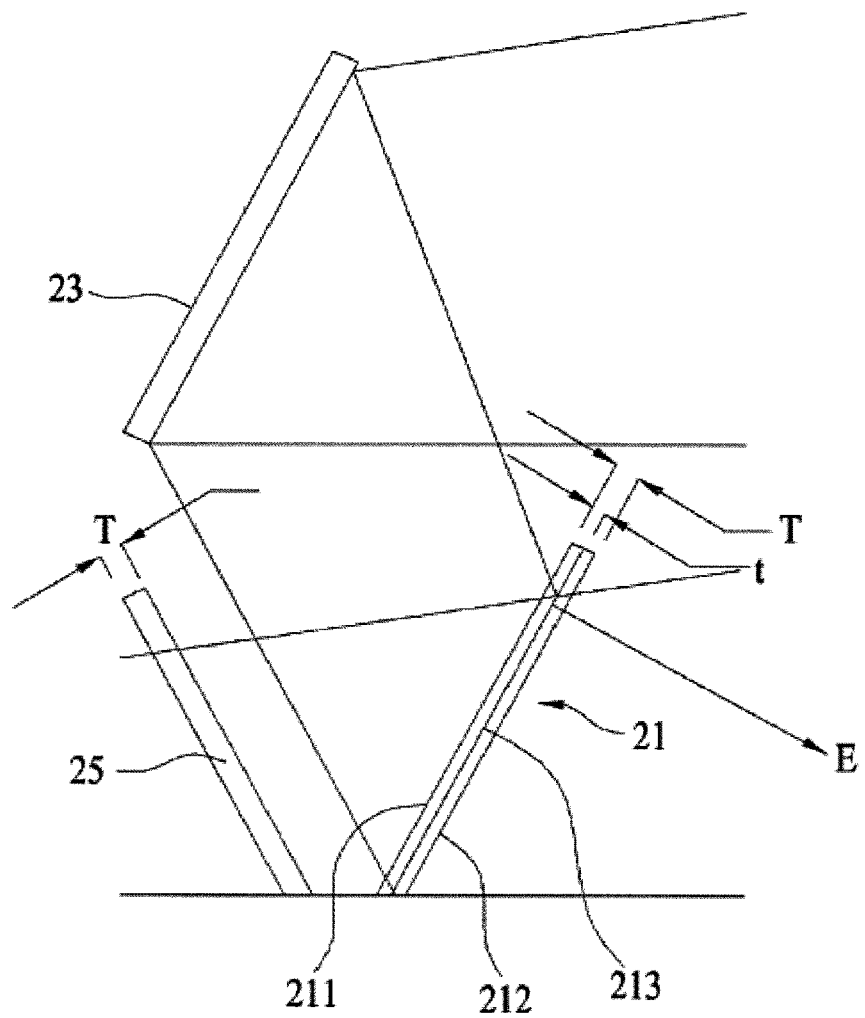

[Fig. 9]
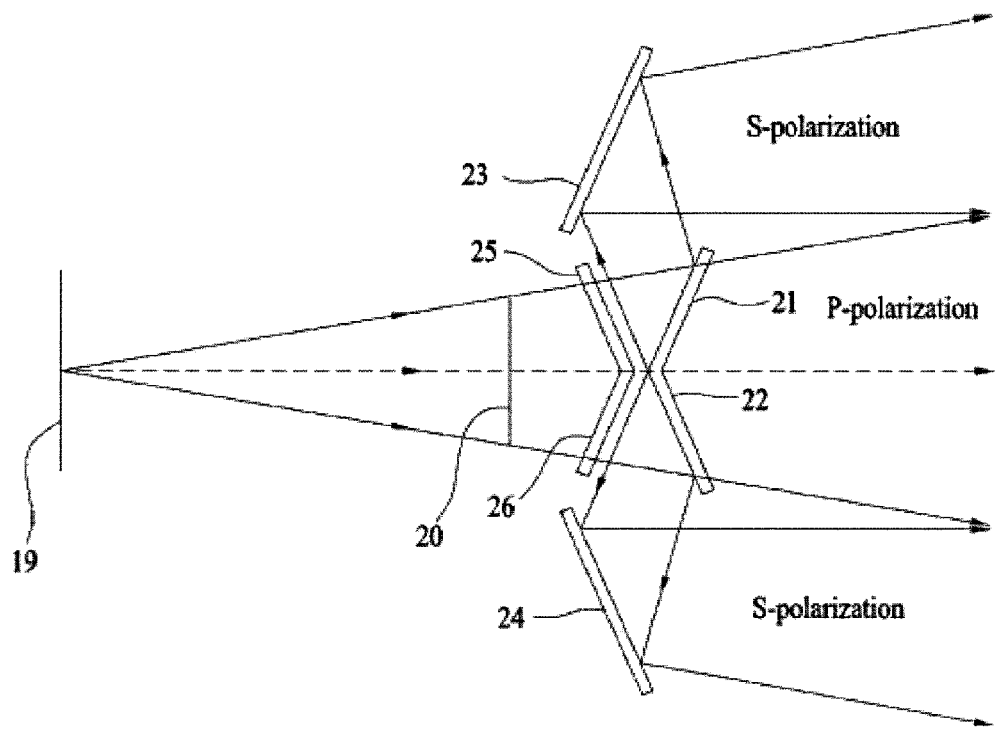
[Fig. 10]
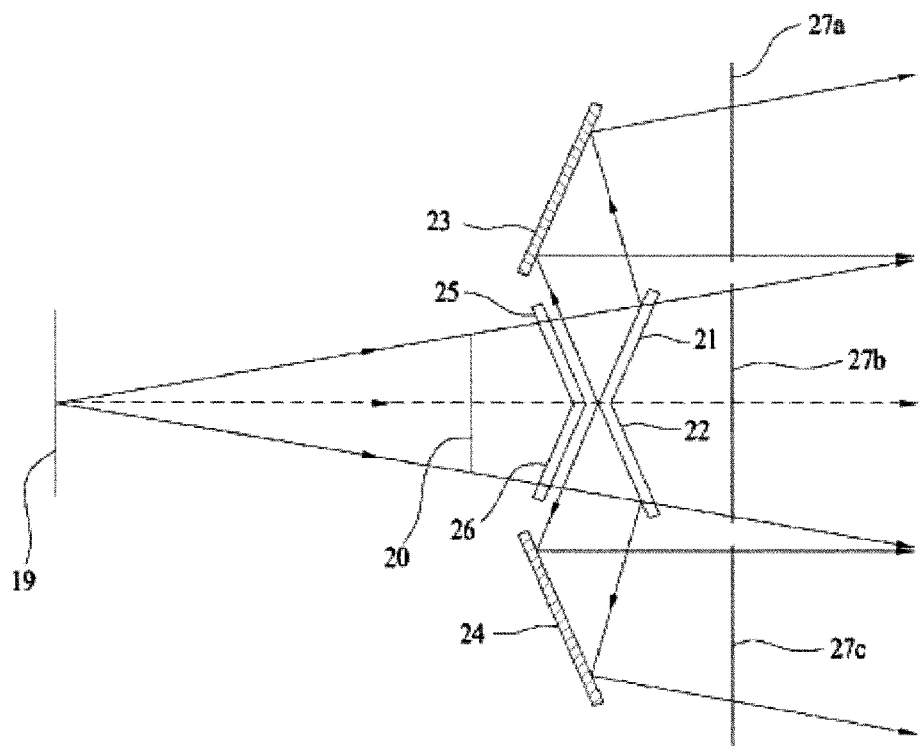

[Fig. 11]
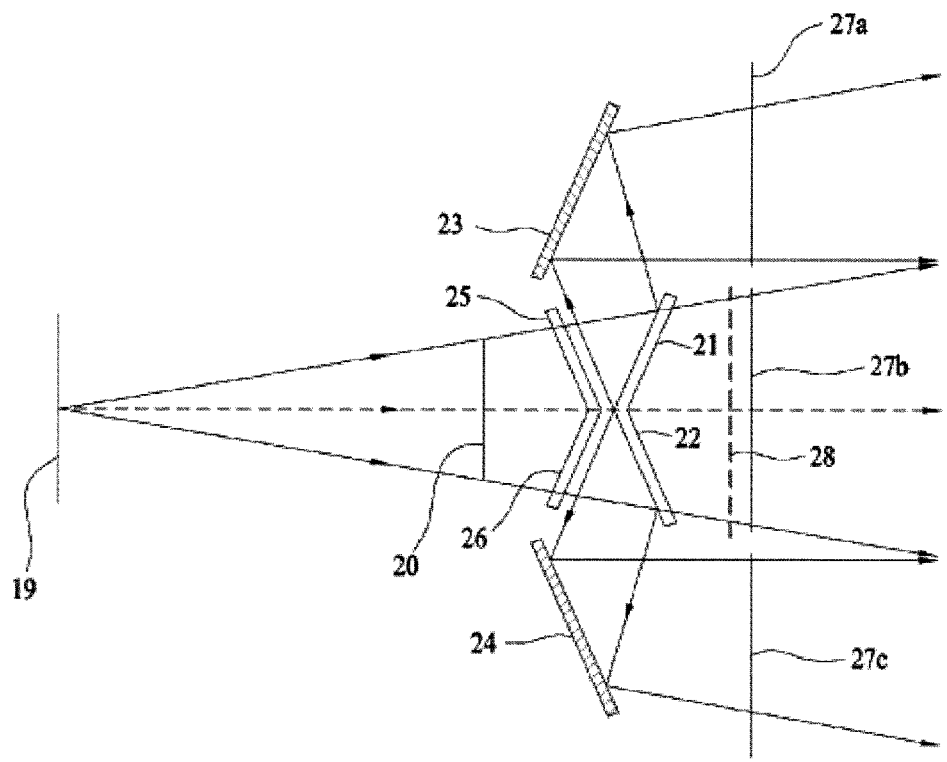
[Fig. 12]
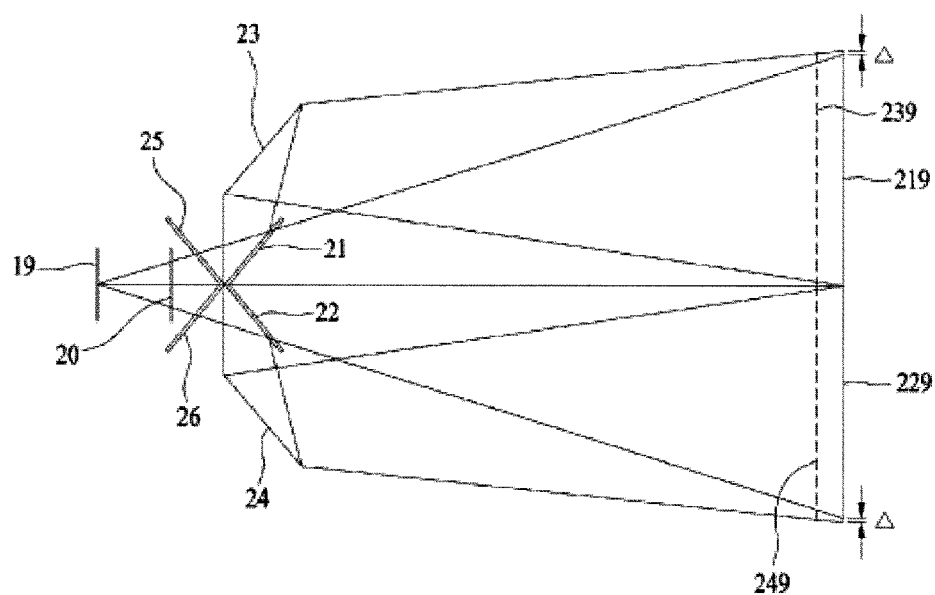

[Fig. 13]
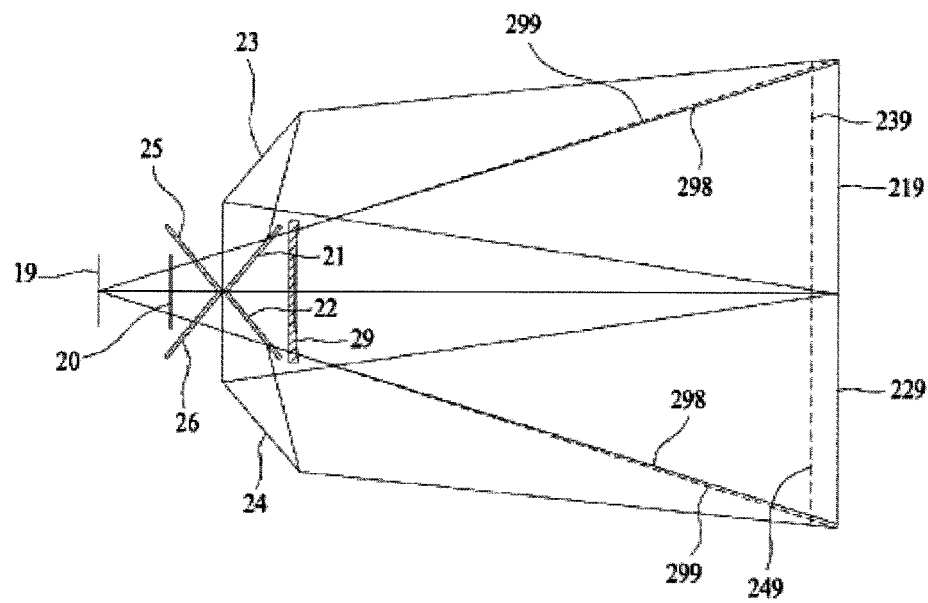
[Fig. 14]
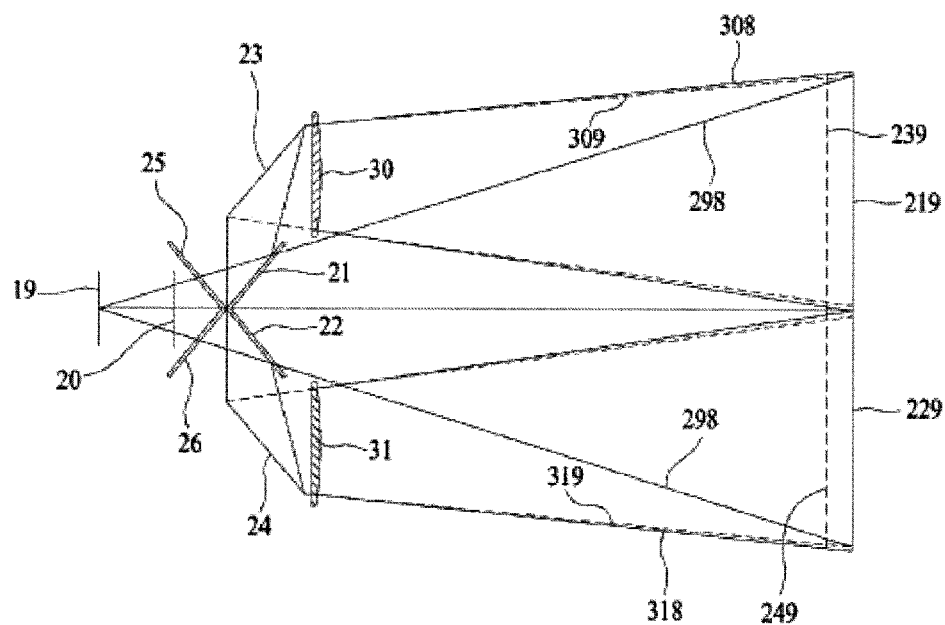

[Fig. 15]
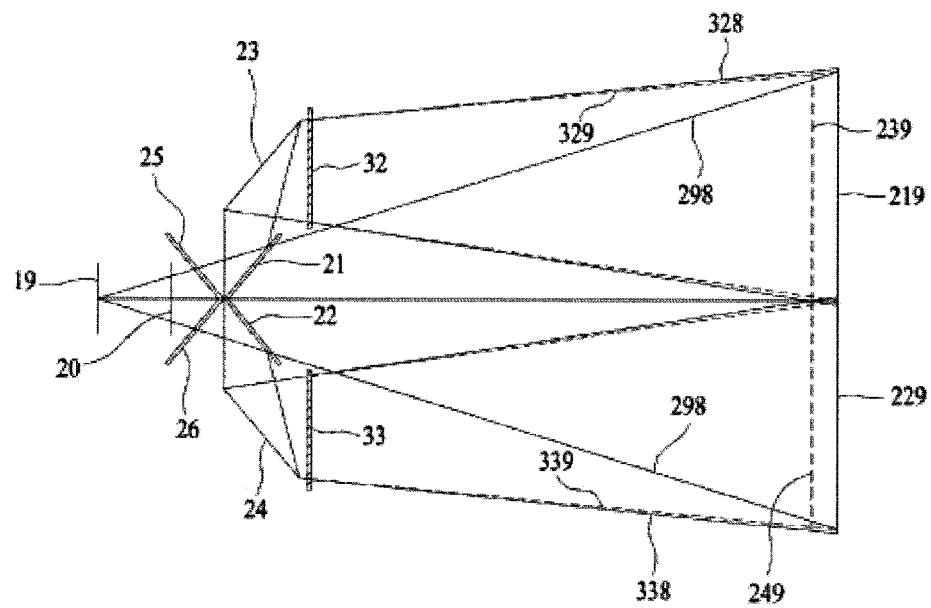
[Fig. 16]
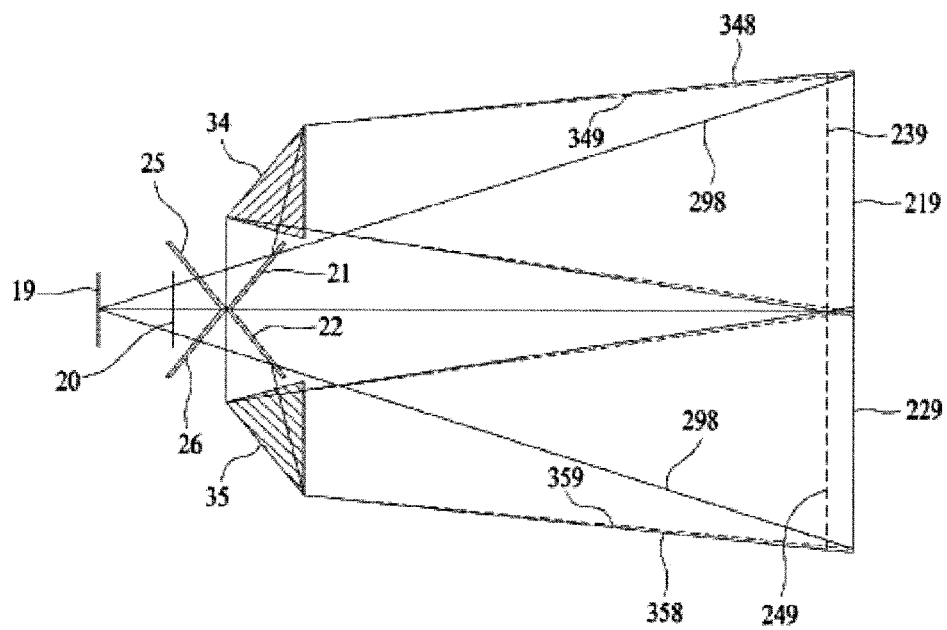

[Fig. 17]
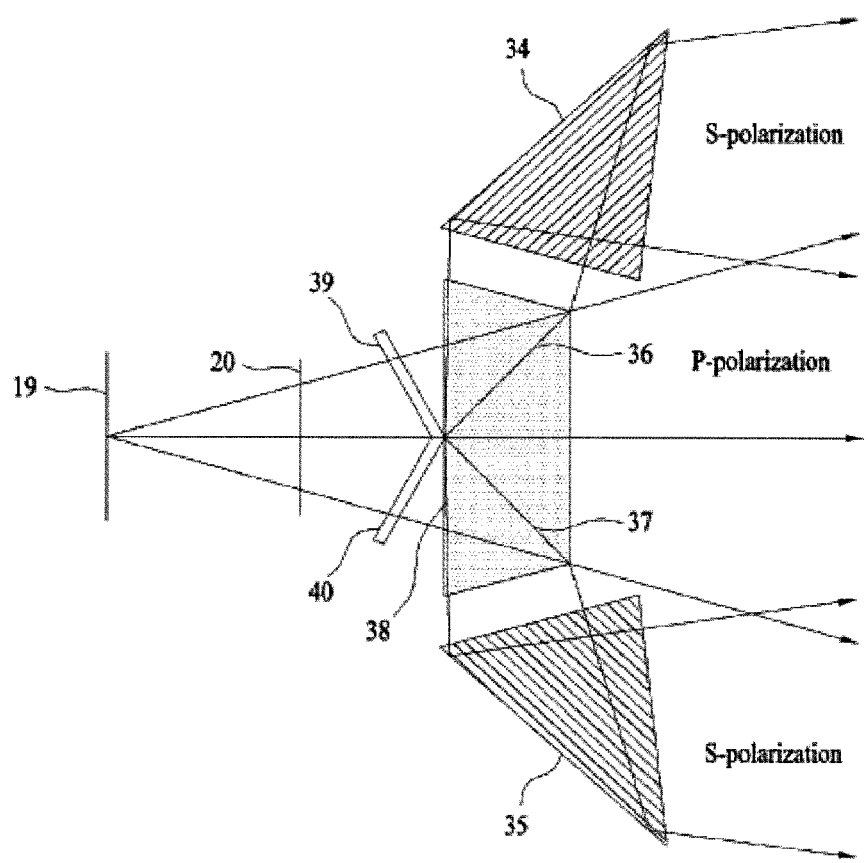

STEREOSCOPIC IMAGE APPARATUS

TECHNICAL FIELD

The present invention relates to a stereoscopic image apparatus that is capable of transmitting some of light constituted by an incident image signal and reflecting the rest of the light to split the light and condensing the split light on a screen to increase brightness.

BACKGROUND ART

FIG. 1 is a view showing a conventional polarizing beam splitter.

When light having a P-polarization and an S-polarization in a mixed state is incident upon a polarizing beam splitter (PBS) 1, the P-polarization is transmitted through the polarizing beam splitter 1 and the S-polarization is reflected by the polarizing beam splitter 1.

The reflected S-polarization and the transmitted P-polarization are directed in the same direction by diamond-shaped prisms 2 and 3.

For example, the P-polarization is transmitted through the prism and is then changed into an S-polarization by a half wave plate (retarder) 4.

As a result, the light having the P-polarization and the S-polarization in the mixed state is changed into the same polarization, e.g. the S-polarization, by the polarizing beam splitter. That is, the light having the P-polarization and the S-polarization in the mixed state has the same direction.

An operation principle of a stereoscopic image apparatus using the conventional polarizing beam splitter is as follows. U.S. Pat. No. 7,857,455 is referred to.

As shown in FIG. 2, light emitted from an image surface 5 generating an image in a projector passes through a projection lens 6 and is then split into two beams by a polarizing beam splitter 7.

That is, light having an S-polarization state and a P-polarization state is reflected by the polarizing beam splitter 7 or transmitted through the polarizing beam splitter 7.

The transmitted or reflected P-polarization component is changed into S-polarization while passing through a half wave retarder 8. The S-polarization is concentrated on a projection screen via reflective members 9 and 10, a polarizer 11, and a modulator 12.

The modulator 12 may change a polarization state/direction, for example, according to an electric signal.

On the other hand, the S-polarization component reflected by the polarizing beam splitter 7 reaches the projection screen via a reflective member 13 in a state in which the S-polarization is maintained in the same direction.

Consequently, the light, having mixed polarization states/directions, emitted from the image surface 5 is changed into a single S-polarization.

However, the stereoscopic image apparatus using the conventional polarizing beam splitter has the following problems.

In general, a vertical exit angle of the projector is about 15 degrees. A case in which the exit angle is 15 degrees is shown in FIG. 3. A polarizer and a modulator are omitted from FIG. 3 for simplicity's sake.

It is assumed that the distance between a polarizing beam splitter and a reflective member 16 and the distance between the polarizing beam splitter and another reflective member 16 are hi and h2, respectively, and the distances between the respective reflective member 16 and 17 and a screen 18 are L1 and L2, respectively.

In this case, an angle $\theta1$ between the light reflected by the reflective member 16 and an optical axis of the light emitted from the projector is TAN−1(h1/L1) and an angle $\theta2$ between the light reflected by the reflective member 17 and the optical axis of the light emitted from the projector is TAN−1(h2/L2).

Reference numeral 161 indicates the light reflected by the reflective member 16 and reference numeral 171 indicates the light reflected by the reflective member 17.

Distortion of an image on the screen 18 due to the angles $\theta1$ and $\theta2$ is as follows. FIG. 4 is an enlarged view showing part (A) of FIG. 3.

Referring to FIG. 4, reference numeral 161 indicates the light reflected by the reflective member 16 and reference numeral 171 indicates the light reflected by the reflective member 17.

In addition, reference numeral 162 indicates an image-forming surface of the light reflected by the reflective member 16 and reference numeral 172 indicates an image-forming surface of the light reflected by the reflective member 17.

On the assumption that the height of the screen 18 is H, a height difference d1 between the image-forming surface of the light reflected by the reflective member 16 and the image on the screen 18 and a height difference d2 between the image-forming surface of the light reflected by the reflective member 17 and the image on the screen 18 are expressed as follows.

$$d1 = H\ \mathrm{TAN}(\theta1), d2 = H\ \mathrm{TAN}(\theta2)$$

Consequently, the beams reflected by the reflective members 16 and 17 form images on the image-forming surface with a distance difference $\Delta = (H/2)\{\mathrm{TAN}(\theta1) + \mathrm{TAN}(\theta2)\}$.

In a case in which h1=h2=340 mm, L1=L2=15000 mm, and H=8500 mm, $\theta1=\theta2=1.3$ degrees and, therefore, $\Delta=193$ mm.

This means that the light reflected by the reflective member 16 and the light reflected by the reflective member 17 deviate from each other on the image-forming surface by a maximum of 193 mm. In general, the spot size of light is several mm. As the distance from the center of the screen 18 is increased, therefore, the image is less visible, which leads to limitations in use.

DISCLOSURE

Technical Problem

An object of the present invention devised to solve the problem lies on a stereoscopic image apparatus that is capable of improving quality of a stereoscopic image and minimizing loss of optical energy.

Technical Solution

In accordance with an aspect of the present invention, the above and other objects can be accomplished by the provision of a stereoscopic image apparatus including a polarizing beam splitter to reflect or transmit incident light based on polarization states of the light to split the light into at least three different directions, a reflective member to reflect the light reflected by the polarizing beam splitter to a screen, at least one modulator to modulate the light reflected by the reflective member and the light transmitted through the polarizing beam splitter, and a refractive member disposed in an advancing direction of light to be incident upon the polarizing beam splitter and adapted to refract the light to be incident upon the polarizing beam splitter.

Advantageous Effects

According to the present invention, it is possible to overcome deterioration in image quality and impossibility in realization of a large screen due to misalignment of two beams on the screen, which are caused in the conventional stereoscopic image apparatus.

That is, a path of light is divided into one path of transmitted light and two paths of reflected light and the divided beams are combined on the screen, thereby considerably reducing a height error of an image.

Furthermore, two polarizing beam splitters connected to each other while being bent are provided such that some of incident light is reflected by and transmitted through one of the polarizing beam splitters and the rest of the incident light is reflected by and transmitted through the other polarizing beam splitter. Consequently, the beams are divided along the respective paths, thereby achieving a precise stereoscopic image.

Meanwhile, the refractive member is disposed in front of the polarizing beam splitter to prevent the light from being incident upon a dimming area formed at the polarizing beam splitter, thereby preventing loss of optical energy.

That is, light incident upon the center of the refractive member is refracted and refracted beams emit while being uniformly spaced apart from each other and are incident upon the polarizing beam splitter. Since the dimming area is located between the refracted beams, it is possible to prevent the light emitted from the refractive member from entering the dimming area.

In addition, an additional member may be disposed on the path of the transmitted light to increase a divergence angle of the transmitted light or an additional member may be disposed on the path of the reflected light to decrease a divergence angle of the reflected light, thereby reducing a height difference between the transmitted light and the reflected light and thus considerably reducing an error of the image.

In addition, the polarizing beam splitter includes two light transmission members connected to each other and a polarizing beam splitting film disposed between the light transmission members. Consequently, it is possible to remove astigmatism of the light reflected by the polarizing beam splitter and transmitted through the polarizing beam splitter.

Meanwhile, it is possible to reduce the distance between the polarizing beam splitter and the reflective member as compared with the conventional stereoscopic image apparatus, thereby reducing the size of the stereoscopic image apparatus and thus achieving a compact structure of the stereoscopic image apparatus.

It will be appreciated by persons skilled in the art that the effects that could be achieved with the present invention are not limited to what has been particularly described hereinabove and other advantages of the present invention will be more clearly understood from the following detailed description taken in conjunction with the accompanying drawings.

DESCRIPTION OF DRAWINGS

FIG. 1 is a view showing a conventional polarizing beam splitting method to obtain single polarization;

FIG. 2 is a view showing the structure of a conventional stereoscopic image apparatus;

FIGS. 3 and 4 are side sectional views illustrating problems of the conventional stereoscopic image apparatus;

FIG. 5 is a view showing the basic structure of a stereoscopic image apparatus according to the present invention;

FIG. 6 is a view showing paths of light in polarizing beam splitters of the stereoscopic image apparatus according to the present invention;

FIG. 7 is a view showing a path of light in a case in which refractive members are added to the stereoscopic image apparatus according to the present invention:

FIG. 8 is a view showing another form of the polarizing beam splitter of the stereoscopic image apparatus according to the present invention;

FIG. 9 is a view showing the structure of the stereoscopic image apparatus according to the present invention in a case in which the refractive member is added to the stereoscopic image apparatus;

FIG. 10 is a view showing the structure of the stereoscopic image apparatus according to the present invention in a case in which a plurality of different modulators is disposed in the stereoscopic image apparatus;

FIG. 11 is a view showing the structure of the stereoscopic image apparatus according to the present invention in a case in which a half wave retarder is disposed in the stereoscopic image apparatus of FIG. 10;

FIG. 12 is a view showing a path of light in the stereoscopic image apparatus according to the present invention;

FIG. 13 is a side view showing a structure to correct a path of transmitted light in the stereoscopic image apparatus according to the present invention; and FIGS. 14 to 17 are side views showing structures to correct a path of reflected light in the stereoscopic image apparatus according to the present invention.

BEST MODE

Hereinafter, the preferred embodiments of the present invention will be described with reference to the accompanying drawings.

FIG. 5 is a view showing the basic structure of a stereoscopic image apparatus according to the present invention.

Hereinafter, an image signal will be referred to as 'light' for the sake of convenience and, therefore, the term 'light' involves the meaning of the 'image signal.'

As shown in FIG. 5, light, having been emitted from an image surface 19 and passed through a projection lens 20, is incident upon polarizing beam splitters (PBS) 21 and 22 in a state in which the light has a P-polarization and an S-polarization in a mixed state.

For the sake of convenience, the polarizing beam splitter denoted by reference numeral 21 will be referred to as a first polarizing beam splitter and the polarizing beam splitter denoted by reference numeral 22 will be referred to as a second polarizing beam splitter.

The polarizing beam splitters 21 and 22 may not be formed in a single flat plate shape. The polarizing beam splitters 21 and 22 may be formed such that a section defined by the polarizing beam splitters 21 and 22 are bent.

The center of the polarizing beam splitters 21 and 22 may be located on an optical axis of incident light.

The first polarizing beam splitter 21 and the second polarizing beam splitter 22 may be connected to each other. The first polarizing beam splitter 21 and the second polarizing beam splitter 22 may be disposed such that the first polarizing beam splitter 21 and the second polarizing beam splitter 22 face in different directions.

That is, the first polarizing beam splitter 21 and the second polarizing beam splitter 22 may be each formed in a plate shape such that the plate shape of the first polarizing beam splitter 21 and the plate shape of the second polarizing beam splitter 22 are inclined in different directions.

In the above structure, one half of the light incident upon the polarizing beam splitters 21 and 22 may be incident upon the first polarizing beam splitter 21 and the other half of the light incident upon the polarizing beam splitters 21 and 22 may be incident upon the second polarizing beam splitter 22.

The polarizing beam splitters 21 and 22 transmit a specific polarization component (a P-polarization component) and reflect another polarization component (an S-polarization component) in a direction different from a direction in which the light is transmitted to split the light in a plurality of directions.

Consequently, the P-polarization component of the light incident upon the first polarizing beam splitter 21 is transmitted and then advances to a screen.

On the other hand, the S-polarization component of the light incident upon the first polarizing beam splitter 21 is reflected and then advances in a first direction (in an upward direction in FIG. 5).

In addition, the P-polarization component of the light incident upon the second polarizing beam splitter 22 is transmitted and then advances to the screen.

On the other hand, the S-polarization component of the light incident upon the second polarizing beam splitter 22 is reflected and then advances in a second direction (in a downward direction in FIG. 5).

That is, some of the incident light is reflected and the rest of the incident light is transmitted.

The reflected light is also split. Some of the reflected light is reflected by the first polarizing beam splitter 21 and the rest of the reflected light is reflected by the second polarizing beam splitter 22.

In addition, the transmitted light is also split. Some of the transmitted light is transmitted through the first polarizing beam splitter 21 and the rest of the transmitted light is transmitted through the second polarizing beam splitter 22.

Above the first polarizing beam splitter 21 and the second polarizing beam splitter 22 are respectively provided reflective members 23 and 24, such as mirrors, which are spaced apart from the first polarizing beam splitter 21 and the second polarizing beam splitter 22, respectively.

Representative examples of the reflective members 23 and 24 may be the mirrors. However, the present invention is not limited thereto. The reflective members 23 and 24 may be constituted by all elements that are capable of embodying a function to reflect light.

The reflective member denoted by reference numeral 23 will be referred to as a first reflective member and the reflective member denoted by reference numeral 24 will be referred to as a second reflective member.

The light reflected by the first polarizing beam splitter 21 and the first reflective member 23 and the light reflected by the second polarizing beam splitter 22 and the second reflective member 24 each have the S-polarization. The light reflected by the first polarizing beam splitter 21 and the first reflective member 23 and the light reflected by the second polarizing beam splitter 22 and the second reflective member 24 advance to the screen and are then combined with each other on the screen.

The beams reflected and then advancing in two directions may be provided to divide the section of the incident light into two equal parts. The beams reflected and then advancing in the two directions have the same polarization component.

Meanwhile, the beams transmitted through the first polarizing beam splitter 21 and the second polarizing beam splitter 22 advance to the screen along an optical axis while having the P-polarization component.

In the above structure, one half of the light having passed through the projection lens 20 may reach the first polarizing beam splitter 21 and may be then reflected by the first polarizing beam splitter 21 or may be transmitted through the first polarizing beam splitter 21 and the other half of the light transmitted through the projection lens 20 may reach the second polarizing beam splitter 22 and may be then reflected by the second polarizing beam splitter 22 or may be transmitted through the second polarizing beam splitter 22.

In a case in which images having the same size are projected on the screen, therefore, it is possible to considerably reduce the distance between the polarizing beam splitters 21 and 22 and the reflective members 23 and 24 as compared with the conventional stereoscopic image apparatus, which means that it is possible to reduce the size of the stereoscopic image apparatus.

In a case in which the distance between the polarizing beam splitters 21 and 22 and the reflective members 23 and 24 of the stereoscopic image apparatus according to the present invention is equal to the distance between the polarizing beam splitters and the reflective members of the conventional stereoscopic image apparatus, on the other hand, the size of the image projected on the screen in the stereoscopic image apparatus according to the present invention may be considerably greater than the size of the image projected on the screen in the conventional stereoscopic image apparatus based on the above structure.

The reason that the size of the stereoscopic image apparatus may be reduced as described above will hereinafter be described in detail.

FIG. 6 shows paths of light transmitted through the first polarizing beam splitter 21 and the second polarizing beam splitter 22.

As shown in FIG. 6, light, having a diameter D, incident upon the first polarizing beam splitter 21 and the second polarizing beam splitter 22 is refracted when the light is transmitted through the first polarizing beam splitter 21 and the second polarizing beam splitter 22.

In this case, most of the transmitted light is transmitted through the first polarizing beam splitter 21 and the second polarizing beam splitter 22 and moves behind the first polarizing beam splitter 21 and the second polarizing beam splitter 22. However, center light (light having a diameter d) enters the first polarizing beam splitter 21 and the second polarizing beam splitter 22 and then converges upon one point.

Consequently, the light having the diameter d does not reach the screen but becomes extinct.

That is, light is incident upon a bent portion defined between the first polarizing beam splitter 21 and the second polarizing beam splitter 22 and is then concentrated on one point to form a dimming area (DA).

Some of the light having passed through the polarizing beam splitters 21 and 22 passes through the dimming area (DA). At this time, energy of the light is reduced. Consequently, luminous intensity on the screen is lowered with the result that the overall area of the screen is relatively darkened.

Therefore, it is necessary to provide a correction method that is capable of solving the above problem.

FIG. 7 shows a structure related to such a correction method.

As shown in FIG. 7, refractive members 25 and 26 having a refractive index and thickness similar to those of the first polarizing beam splitter 21 and the second polarizing beam splitter 22 are provided.

The refractive members 25 and 26 may be each formed in a plate shape. However, the present invention is not limited thereto.

The refractive member 25 corresponding to the first polarizing beam splitter 21 will be referred to as a first refractive member and the refractive member 26 corresponding to the second polarizing beam splitter 22 will be referred to as a second refractive member.

The shape of the first refractive member 25 is similar to that of the first polarizing beam splitter 21 and the shape of the second refractive member 26 is similar to that of the second polarizing beam splitter 22.

That is, the first refractive member 25 is located above the optical axis and the second refractive member 26 is located under the optical axis. The first refractive member 25 and the second refractive member 26 are connected to each other. A bent portion is formed at the center of the first refractive member 25 and the second refractive member 26.

The first refractive member 25 and the second refractive member 26 may face the first polarizing beam splitter 21 and the second polarizing beam splitter 22, respectively, in a symmetrical fashion.

The first refractive member 25 and the second refractive member 26 are inclined in different directions in a state in which the first refractive member 25 and the second refractive member 26 are connected to each other.

In the above structure, paths of beams are formed as follows.

The beams incident upon the refractive members 25 and 26 are refracted with the result that paths of the beams are changed. The beams move to the polarizing beam splitters 21 and 22.

At this time, an empty area (EA), though which beams do not pass, is formed between the center of the refractive members 25 and 26 and the polarizing beam splitters 21 and 22 since the center of the refractive members 25 and 26 is bent.

The incident path of the light incident upon the dimming area (DA) shown in FIG. 6 corresponds to the empty area (EA) shown in FIG. 7. Since the light does not advance to the empty area (EA) any longer due to refraction of the light by the refractive members 25 and 26, the light is not incident upon the dimming area (DA) any longer. Consequently, it is possible to prevent loss of the light due to light extinction.

FIG. 8 is a view showing a method of reducing astigmatism which may occur in the polarizing beam splitter.

The first polarizing beam splitter 21, the first refractive member 25, and the first reflective member 23 are shown in FIG. 8. However, descriptions of the first polarizing beam splitter 21, the first refractive member 25, and the first reflective member 23 are equally applied to the second polarizing beam splitter 22, the second refractive member 26, and the second reflective member 24.

When light having passing through the first refractive member 25 reaches the first polarizing beam splitter 21, a P-polarization is transmitted through the first polarizing beam splitter 21 and an S-polarization is reflected by the overall surface of the first polarizing beam splitter 21 and then advances to the first reflective member 23.

At this time, the length of the path of the transmitted light is increased by a thickness T of the first polarizing beam splitter 21 as compared with the length of the path of the reflected light. This is because the reflected light does not move in the first polarizing beam splitter 21 and is then reflected but is reflected by the surface of the first polarizing beam splitter 21, whereas the transmitted light passes through the first polarizing beam splitter 21.

In this case, astigmatism of the light may occur due to the difference in length of the path between the reflected light and the transmitted light.

In order to correct such astigmatism, it is necessary to equalize the length of the light reflected by the first polarizing beam splitter 21 and the length of the light transmitted through the first polarizing beam splitter 21.

Consequently, the first polarizing beam splitter 21 is formed by combining two light transmission members 211 and 212 having the same thickness. A polarizing beam splitting film 213 is disposed between the light transmission members 211 and 212.

On the assumption that the thickness of the first polarizing beam splitter 21 is T and the thickness of each of the light transmission members 211 and 212 is t, T=2t (the thickness of the polarizing beam splitting film being ignored).

For the sake of convenience, it is assumed that the thickness of the light transmission member 211 located on the front side is t1 and the thickness of the light transmission member 212 located on the rear side is t2.

The P-polarization of the incident light passes through the front side light transmission member 211, the polarizing beam splitting film 213, and the rear side light transmission member 212. At this time, the length of the path of the transmitted light in the first polarizing beam splitter 21 is t1+t2.

On the other hand, the S-polarization of the incident light passes through the front side light transmission member 211, reaches the polarizing beam splitting film 213 and is reflected by the polarizing beam splitting film 213, and then passes through the front side light transmission member 211.

At this time, the length of the path of the reflected light in the first polarizing beam splitter 21 is t1+t1. Since t1=t2 as described above, the length of the path of the reflected light and the length of the path of the transmitted light are equal. Consequently, it is possible to prevent the occurrence of astigmatism.

The incident angle, the transmission angle, and the reflection angle of the reflected light and the transmitted light are not exactly 0. Since the first polarizing beam splitter 21 and the light transmission members 211 and 212 constituting the first polarizing beam splitter 21 are very thin, however, the change in length of the paths due to the angles may be ignored.

FIG. 9 is a view showing basic construction of a polarizing beam splitting method according to the present invention.

The section of the reflected S-polarization is divided into two equal parts. As a result, the distance between an optical axis of the projection lens 20 and the first reflective member 23 and the distance between the optical axis of the projection lens 20 and the second reflective member 24 are reduced by half. For example, the distance between an optical axis of the projection lens 20 and the first reflective member 23 and the distance between the optical axis of the projection lens 20 and the second reflective member 24 may be 75 mm.

The above distance in the polarizing beam splitting method according to the present invention is equivalent to ¼ the distance, which is 340 mm, in the conventional polarizing beam splitting method shown in FIG. 2, which means that angle errors θ1 and θ2 with the image-forming surface on the screen 18 shown in FIG. 2 are reduced to about ¼ those when the conventional method is used.

Next, a description will be given of a case in which the structure shown in FIG. 9 is applied to a stereoscopic image apparatus having enhanced brightness.

Referring to FIG. 10, the S-polarization reflected by the first reflective member 23 and the second reflective member 24 is modulated by a first modulator 27a and a third modulator 27c, respectively.

On the other hand, the P-polarization transmitted through the first polarizing beam splitter 21 and the second polarizing beam splitter 22 is modulated by a second modulator 27b.

The first modulator 27a and the third modulator 27c are provided such that the first modulator 27a and the third modulator 27c have the same phase retardation function. The second modulator 27b is provided such that the second modulator 27b has a half wavelength phase difference from the first and third modulators 27a and 27c.

The first and third modulators 27a and 27c convert a state of the S-polarization according to an electric signal. For example, the first and third modulator 27a and 27c convert the state of the S-polarization from a linear polarization state to a circular polarization state.

Meanwhile, the P-polarization transmitted through the polarizing beam splitters 21 and 22 is modulated into an S-polarization while passing through the second modulator 27b. At the same time, the state of the P-polarization is modulated from a linear polarization state to a circular polarization state.

The first and third modulator 27a and 27c convert a state of the S-polarization from a linear polarization state to a circular polarization state while maintaining the S-polarization. Consequently, the first and third modulator 27a and 27c perform a ¼ wavelength phase retardation function.

On the other hand, the second modulator 27b converts the state of the P-polarization from a linear polarization state to a circular polarization state (performs ¼ wavelength phase retardation function) while converting the P-polarization into an S-polarization (performing a ½ wavelength phase retardation function). Consequently, the second modulator 27b performs a total of ¾ wavelength phase retardation function.

In the embodiment shown in FIG. 10, the first to third modulators 27a to 27c may be separated from each other or spaced apart from each other.

This is because, in a state in which the first modulator 27a, the second modulator 27b, and the third modulator 27c are successively disposed, characteristics of phase retardation generated in the first and third modulator 27a and 27c are different from those of phase retardation generated in the second modulator 27b.

FIG. 11 is a view showing another embodiment having another element added to the embodiment shown in FIG. 10.

FIG. 11 shows a structure in which a half wave retarder 28 to convert the P-polarization transmitted through the first polarizing beam splitter 21 and the second polarizing beam splitter 22 into an S-polarization is added to the structure shown in FIG. 10.

That is, the half wave retarder 28 is disposed at the rear of the first and second polarizing beam splitters 21 and 22 and is disposed in front of the second modulator 27b.

In other words, the half wave retarder 28 is disposed between the first and second polarizing beam splitters 21 and 22 and the second modulator 27b.

In the above structure, the light having passed through the half wave retarder 28 and the light reflected by the first and second reflective members 23 and 24 have characteristics of the same polarization, i.e. the S-polarization.

Consequently, it is possible to convert the polarizations from a linear polarization state to a circular polarization state using a single large-sized modulator instead of the first, second, and third modulators 27a, 27b, and 27c. The single large-sized modulator may retard the phase of incident light by a ¼ wavelength to convert the light from a linear polarization state to a circular polarization state.

Meanwhile, although not shown, the half wave retarder 28 may be disposed between the first reflective member 23 and the first modulator 27a and/or between the second reflective member 24 and the third modulator 27c.

In a case in which both a polarization moving along a reflection path and a polarization moving along a transmission path reach the screen, the polarizations must be changed into a single polarization (a P-polarization or an S-polarization).

In a case in which the half wave retarder 28 is disposed on the transmission path, therefore, the polarizations reaching the screen may form an image on the screen in an S-polarization state.

On the other hand, in a case in which the half wave retarder 28 is disposed on the reflection path, the polarizations reaching the screen may form an image on the screen in a P-polarization state.

According to the present invention as described above, the number of paths of beams projected on the screen in an overlapping fashion is 3.

That is, the paths of beams include a first path along which light is transmitted through the first polarizing beam splitter 21 and the second polarizing beam splitter 22 and is then projected on the screen, a second path along which light is reflected by the first polarizing beam splitter 21 and the first reflective member 23 and is then projected on the screen, and a third path along which light is reflected by the second polarizing beam splitter 22 and the second reflective member 24 and is then projected on the screen.

Next, a description will be given of a method of overcoming a difference between the image-forming surface of the light reflected by the first polarizing beam splitter 21 and the second polarizing beam splitter 22 and the image-forming surface of the light transmitted through the first polarizing beam splitter 21 and the second polarizing beam splitter 22 to provide images having the same size on the screen.

FIG. 12 shows a height difference A between image-forming surfaces of light primarily reflected by the first polarizing beam splitter 21 and the second polarizing beam splitter 22 and secondarily reflected by the first reflective member 23 and the second reflective member 24 and image-forming surfaces of light transmitted through the first polarizing beam splitter 21 and the second polarizing beam splitter 22.

Reference numeral 219 indicates the image-forming surface of the light transmitted through the first polarizing beam splitter 21 and reference numeral 229 indicates the image-forming surface of the light transmitted through the second polarizing beam splitter 22.

Reference numeral 239 indicates the image-forming surface of the light reflected by the first reflective member 23 and reference numeral 249 indicates the image-forming surface of the light reflected by the second reflective member 24.

The image-forming surfaces 239 and 249 of the beams moving along reflection paths are located in front of the image-forming surfaces 219 and 229 of the beams moving along transmission paths. The height difference A is generated due to such a difference in position.

The height difference A may be reduced using the following four methods.

A first method is to increase a divergence angle of the light transmitted through the first polarizing beam splitter 21 and the second polarizing beam splitter 22 using a lens 29 as shown in FIG. 13.

The lens may have characteristics of a concave lens to increase the divergence angle of the light.

In this method, a light path 299 after correction is performed by the lens 29 diverges more than a light path 298 before correction is performed by the lens 29 with the result that the size of an image on the screen is increased.

Referring to FIG. 13, a transmission path indicated by a solid line indicates the path 298 before correction is performed by the lens 29 and a transmission path indicated by a dotted line indicates the path 299 after correction is performed by the lens 29.

It can be seen that the path indicated by the dotted line diverges more than the path indicated by the solid line.

As a result, the size of an image formed on the screen by the beams moving along the transmission paths becomes equal to the size of an image formed on the screen by the beams moving along the reflection paths, whereby the above-described height difference A may be removed.

At this time, it should be noted that the lens 29 must be disposed between the wo reflection paths such that the beams moving along the reflection paths do not interfere with the lens 29.

A second method of removing the height difference A is to dispose lenses 30 and 31 to reduce divergence angles of the beams on the reflection paths as shown in FIG. 14.

The lenses 30 and 31 may have characteristics of convex lenses to decrease the divergence angles of the beams to a certain extent.

The lenses 30 and 31 may be disposed adjacent to the first reflective member 23 and the second reflective member 24 in a state in which the lenses 30 and 31 are located on paths along which the beams reflected by the first reflective member 23 and the second reflective member 24 advance.

In this method, light paths 309 and 319 after correction is performed by the lenses 30 and 31 diverge less than light paths 308 and 318 before correction is performed by the lenses 30 and 31 with the result that the size of an image on the screen is decreased.

Referring to FIG. 14, reflection paths indicated by solid lines indicate the paths 308 and 318 before correction is performed by the lenses 30 and 31 and reflection paths indicated by dotted lines indicate the paths 309 and 319 after correction is performed by the lenses 30 and 31.

It can be seen that the paths indicated by the dotted lines diverge less than the paths indicated by the solid lines.

As a result, the size of an image formed on the screen by the beams moving along the reflection paths becomes equal to the size of an image formed on the screen by the beams moving along the transmission paths, whereby the above-described height difference A may be removed.

At this time, it should be noted that the lenses 30 and 31 must deviate from the transmission paths such that the beams moving along the transmission paths do not interfere with the lenses 30 and 31.

On the other hand, it is possible to use a method of correcting paths of beams using plates or prisms 32 and 33 to reduce divergence angles of the beams as shown in FIG. 15 instead of using the correction method using the lenses 30 and 31 as shown in FIG. 14.

This is a third method of removing the height difference A.

The plates or prisms 32 and 33 may have characteristics of convex lenses to decrease the divergence angles of the beams to a certain extent.

The plates or prisms 32 and 33 may be disposed adjacent to the first reflective member 23 and the second reflective member 24 in a state in which the plates or prisms 32 and 33 are located on paths along which the beams reflected by the first reflective member 23 and the second reflective member 24 advance.

In this method, light paths 329 and 339 after correction is performed by the plates or prisms 32 and 33 diverge less than light paths 328 and 338 before correction is performed by the plates or prisms 32 and 33 with the result that the size of an image on the screen is decreased.

Referring to FIG. 15, reflection paths indicated by solid lines indicate the paths 328 and 338 before correction is performed by the plates or prisms 32 and 33 and reflection paths indicated by dotted lines indicate the paths 329 and 339 after correction is performed by the plates or prisms 32 and 33.

It can be seen that the paths indicated by the dotted lines diverge less than the paths indicated by the solid lines.

As a result, the size of an image formed on the screen by the beams moving along the reflection paths becomes equal to the size of an image formed on the screen by the beams moving along the transmission paths, whereby the above-described height difference A may be removed.

At this time, it should be noted that the plates or prisms 32 and 33 must deviate from the transmission paths such that the beams moving along the transmission paths do not interfere with the plates or prisms 32 and 33.

A fourth method of removing the height difference A is to use reflective member-prism assemblies (mirror-prism assemblies) 34 and 35 as shown in FIG. 16.

The reflective member-prism assemblies 34 and 35 are configured such that the lenses 30 and 31 or the plates or prisms 32 and 33 shown in FIG. 14 or 15 are easily and conveniently spaced apart from the reflective members.

The reflective member-prism assemblies 34 and 35 reduce divergence angles of beams.

The reflective member-prism assemblies 34 and 35 may be located on paths along which the beams reflected by the first polarizing beam splitter 21 and the second polarizing beam splitter 22 advance.

In this method, light paths 349 and 359 after correction is performed by the reflective member-prism assemblies 34 and 35 diverge less than light paths 348 and 358 before correction is performed by the reflective member-prism assemblies 34 and 35 with the result that the size of an image on the screen is decreased.

Referring to FIG. 16, reflection paths indicated by solid lines indicate the paths 348 and 358 before correction is performed by the reflective member-prism assemblies 34 and 35 and reflection paths indicated by dotted lines indicate the paths 349 and 359 after correction is performed by the reflective member-prism assemblies 34 and 35.

It can be seen that the paths indicated by the dotted lines diverge less than the paths indicated by the solid lines.

As a result, the size of an image formed on the screen by the beams moving along the reflection paths becomes equal to the size of an image formed on the screen by the beams moving along the transmission paths, whereby the above-described height difference A may be removed.

Meanwhile, it is possible to provide the same effect even when using a polarizing beam splitter constituted by a prism 38 having two polarizing beam splitting surfaces 36 and 37 as shown in FIG. 17.

That is, the polarizing beam splitter may include the polarizing beam splitting surfaces 36 and 37 connected to each other while being inclined and the prism 38.

A polarization having a specific direction (e.g. a P-polarization) is transmitted through the polarizing beam splitting surfaces 36 and 37.

On the other hand, a polarization having another direction (e.g. an S-polarization) is reflected by the polarizing beam splitting surfaces 36 and 37 and the path of the reflected light is corrected by the prism 38.

That is, the path of the reflected light is corrected such that the path of the reflected light diverges less.

Meanwhile, refractive members 39 and 40 may be disposed in front of the polarizing beam splitter. The function and structure of the refractive members 39 and 40 are the same as those of the refractive members 25 and 26 shown in FIG. 7.

Accordingly, a description of the refractive members 39 and 40 will be replaced by a description of the refractive members 25 and 26 shown in FIG. 7 and, therefore, will be omitted.

According to the present invention as described above, it is possible to reduce the difference between the advancing path of the reflected light and the advancing path of the transmitted light, thereby obtaining a high-quality stereoscopic image.

In addition, it is possible to reduce the distance among the elements of the stereoscopic image apparatus as compared with the conventional stereoscopic image apparatus, thereby reducing the overall size of the stereoscopic image apparatus.

Those skilled in the art will appreciate that the present invention may be embodied in other specific forms than those set forth herein without departing from the spirit and essential characteristics of the present invention. The above description is therefore to be construed in all aspects as illustrative and not restrictive. The scope of the invention should be determined by reasonable interpretation of the appended claims and all changes coming within the equivalency range of the invention are intended to be within the scope of the invention.

The invention claimed is:

1. A stereoscopic image apparatus for projecting a stereoscopic image towards an image-forming surface, the stereoscopic image apparatus comprising:
    a polarization beam splitter adapted to split an incident image light into a transmitted light having a first state of polarization, and first and second reflected lights having a second state of polarization, the second state being different from the first state, wherein the polarization beam splitter has at least one prism and first and second polarization beam splitting surfaces arranged at an angle to each other, and a junction of the first and second polarization beam splitting surfaces is located on a path of the incident image light;
    first and second reflective members configured to modify paths of the first and the second reflected lights so that the transmitted light and the first and the second reflected lights collectively form the stereoscopic image; and
    first, second and third polarization modulators configured to selectively switch the polarization states of the transmitted light and the first and the second reflected lights between the first and the second states of polarization, wherein the first, the second and the third polarization modulators are controlled to selectively switch the polarization state of the transmitted light and the first and the second reflected lights to have the same state of polarization,
    wherein the stereoscopic image is formed by overlapping of a first image formed from the transmitted light and a second image formed from the first and second reflected lights, and wherein the second image is formed by combining the first and second reflected lights, the second image having at least one non-overlapped area.

2. The stereoscopic image apparatus of claim 1, wherein the first and second reflective members are concave and are each operable to decrease a divergence angle of the first and second reflected lights respectively.

3. The stereoscopic image apparatus of claim 1, further comprising an additional member disposed on a path of the transmitted light configured to increase a divergence angle of the transmitted light.

4. The stereoscopic image apparatus of claim 1, further comprising a lens disposed on a path of the transmitted light following the polarization beam splitter.

5. The stereoscopic image apparatus of claim 4, wherein the lens is operable to increase the divergence angle of the light transmitted through the polarization beam splitter.

6. The stereoscopic image apparatus of claim 4, wherein the lens is concave.

7. The stereoscopic image apparatus of claim 1, further comprising a first lens disposed in a first reflected light path after the first reflective member, and a second lens disposed in a second reflected light path after the second reflective member.

8. The stereoscopic image apparatus of claim 7, wherein the first and second lenses are operable to decrease divergence angles of the first and second reflected light paths respectively.

9. The stereoscopic image apparatus of claim 7, wherein the first and second lenses are convex lenses.

10. The stereoscopic image apparatus of claim 1, wherein the first state of polarization is P-polarization and the second state of polarization is S-polarization.

11. The stereoscopic image apparatus of claim 1, further comprising a half wave retarder to make the transmitted light, and the first and second reflected light have the same state of polarization.

12. The stereoscopic image apparatus of claim 1, wherein the first and second reflective members are formed as a first prism and a second prism respectively.

13. The stereoscopic image apparatus of claim 12, wherein the first prism and the second prism are further configured to decrease a divergence angle of the first and the second reflected light.

14. The apparatus according to claim 1, wherein the polarization beam splitter is configured to receive the incident image light sequentially passing through the at least one prism and at least one of the first and second polarization beam splitting surfaces.

15. A stereoscopic image apparatus for projecting a stereoscopic image towards an image-forming surface, the stereoscopic image apparatus comprising:
    a polarization beam splitter adapted to split an incident image light into a transmitted light having a first state of polarization, and first and second reflected lights having a second state of polarization, the second state being different from the first state, wherein the polarization beam splitter has at least one prism and first and second polarization beam splitting surfaces arranged at an angle to each other, and a junction of the first and second polarization beam splitting surfaces is located on a path of the incident image light;

first and second reflective members configured to modify paths of the first and the second reflected lights so that the transmitted light and the first and the second reflected lights collectively form the stereoscopic image;

a lens disposed in a light path of the transmitted light following the polarization beam splitter; and first, second and third polarization modulators configured to selectively switch the polarization states of the transmitted light and the first and the second reflected lights between the first and the second states of polarization, wherein the first, the second and the third polarization modulators are controlled to selectively switch the polarization state of the transmitted light and the first and the second reflected lights to have the same state of polarization.

16. The stereoscopic image apparatus of claim 15, wherein the stereoscopic image is formed by overlapping of a first image formed from the transmitted light and a second image formed from the first and second reflected lights, and wherein the second image is formed by combining the first and second reflected lights, the second image having at least one non-overlapped area.

17. The stereoscopic image apparatus of claim 15, wherein the lens is operable to increase the divergence angle of the light transmitted through the polarization beam splitter.

18. The stereoscopic image apparatus of claim 15, wherein the lens is concave.

19. The stereoscopic image apparatus of claim 15, further comprising a half wave retarder to make the transmitted light, and the first and second reflected light have the same state of polarization.

20. The stereoscopic image apparatus of claim 15, wherein each of the first and second reflective members comprise a mirror.

* * * * *